United States Patent [19]

Gonczy et al.

[11] Patent Number: 4,615,875

[45] Date of Patent: Oct. 7, 1986

[54] PROCESS FOR PREPARING HIGH PURITY ALPHA-ALUMINA

[75] Inventors: Stephen T. Gonczy, Mt. Prospect; Roy T. Mitsche, Wauconda, both of Ill.

[73] Assignee: Allied Corporation, Morristown, N.J.

[21] Appl. No.: 825,163

[22] Filed: Feb. 3, 1986

[51] Int. Cl.$^4$ .................................................. C01F 7/02
[52] U.S. Cl. .................................. 423/626; 252/313.1; 423/627
[58] Field of Search ................... 423/626, 625, 627; 252/313.1

[56] References Cited

U.S. PATENT DOCUMENTS

| | | | |
|---|---|---|---|
| 3,340,205 | 9/1967 | Hayes et al. | 423/625 |
| 3,925,256 | 12/1975 | Rolf et al. | 423/626 |
| 4,028,216 | 6/1977 | Michalko | 423/626 |
| 4,032,472 | 6/1977 | McCallister | 423/626 |
| 4,151,267 | 4/1979 | Puskas | 423/626 |

Primary Examiner—H. T. Carter
Attorney, Agent, or Firm—Thomas K. McBride; John F. Spears, Jr.

[57] ABSTRACT

High purity alumina with a low sodium content and with a friable, easily ball milled structure is produced in this invention through a modified sol-gel procedure which includes digestion of the contaminant containing aluminum metal with hydrochloric acid in the presence of excess aluminum, removal of the contaminants, seeding the resulting sol with high purity alumina, drying to a solid, and then calcining said seeded sol solids to produce said high purity alpha alumina.

10 Claims, No Drawings

PROCESS FOR PREPARING HIGH PURITY ALPHA-ALUMINA

BACKGROUND OF THE INVENTION

In the past few years the electronics industry has increased the use and manufactured quantity, as well as demand for higher quality, of high purity alumina substrate chips for circuitry substrates used in component parts of computers and other devices such as switches and calculators. These chips need to be produced from a very pure alpha alumina, utilized as a substrate for the deposition of the various electronic pathways. Impurities in this alumina would cause leakage of the electric current through the substrate and cause dielectric losses which make such chips unreliable. One method for producing alpha alumina consisted of the production of a sol-gel of alumina followed by drying and subsequent calcination to the alpha form. As existing, this method produces impure material with a very hard structure resulting in large expenditures of energy to reduce the particulate to the proper size.

BRIEF SUMMARY OF THE INVENTION

The sol-gel method for producing alumina was developed to produce catalytic substrates wherein low levels of metal impurities were not detrimental to the operation of the catalyst whereas in contradistinction to prior methods, the method involved in this invention concerns itself with the preparation of the ultrapure alpha alumina through the sol-gel method as well as the production of a product that is friable, or easily crushed.

One object of this invention then is to provide a method for producing high purity, alpha alumina in a form that requires less time and energy for crushing to a requisite powder size.

A further object of this invention is to provide a product that is ultrapure and friable, or easily crushed.

In one embodiment is found a method for the preparation of high purity, fine particulate, friable alpha alumina from an alumina sol comprising the steps of (a) digesting aluminum metal containing contaminants in an excess of aluminum metal with hydrochloric acid and water at digestion conditions to produce an alumina sol containing solid contaminants and excess aluminum metal;

(b) purifying said sol;

(c) seeding said purified sol with fine particulate alpha alumina;

(d) drying said seeded sol to produce an alpha alumina precursor;

(e) calcining said dried precursor at calcination conditions to produce a high purity, friable alpha alumina; and, (f) recovering said alpha alumina.

In a more specific embodiment is found a process in which an alumina sol is prepared using a hydrochloric acid digestion of aluminum in the presence of excess contaminant containing aluminum at a temperature in the range of from about 25° C. to about 100° C. for about 24 hrs to about 48 hrs, to form an aluminum sol containing solid contaminants and excess aluminum metal, filtering the resulting sol to remove the contaminants, seeding the purified sol with fine particulate alpha alumina, spray drying the seeded sol and thereafter calcining said spray dried sol at a temperature in the range of from about 1000° C. to about 1100° C. and a time in the range from about 60 minutes to about 120 minutes to form a friable, pure alpha alumina.

DETAILED DESCRIPTION OF THE INVENTION

In order to meet the need for high purity alpha alumina, we have devised a process to produce this desired high purity, fine particulate alpha alumina. This process begins with high purity aluminum metal containing some contaminants of the type hereinafter set forth in greater detail and converts it into a sol utilizing hydrochloric acid of a molarity in the range of from about 3 molar to about 12 molar while utilizing an excess of the aluminum metal, and digesting the aluminum metal in the acid at a temperature range of from about 25° C. to about 100° C. and for a period of time in the range of from about 24 hours to about 48 hours. Because of this excess of aluminum, which may be in the range of from about 10% to about 1000%, most of the impurities present in the aluminum metal tend to remain undissolved while the aluminum goes into solution. Purification of this sol is carried out by filtering the undissolved impurities (dross) as well as the unreacted aluminum metal, using any method known to those in the art, thereby leaving the sol as a viscous, water-clear liquid. This purified sol is then seeded with fine (0.01 to 10 microns) particles of alpha alumina prior to drying said sol by using methods such as spray drying, flash drying, or spin drying to remove the volatiles and to provide a solid. Subsequently, the solid is heated (calcined) in a temperature range of from about 1000° C. to about 1100° C. for a time range of about 60 minutes to about 120 minutes to produce an easily crushed (friable), high purity, fine particulate, alpha alumina with the proper purity and particle size to be used in formation of electronic fabrications necessitating an alumina substrate.

While the sol-gel process is known to the art, it is primarily utilized to produce catalyst substrates wherein low level metal impurities are not considered harmful, and wherein aging is an important process, but filtering is not important since an excess of aluminum metal is not required and the impurities therefore become dissolved into the sol. A product made by the known catalyst substrate method would not be of the proper purity necessary to produce alumina for the electronic industry since residual metals would affect the electrical resistivity of the substrate in a non-uniform way. In this invention, about 90% of the major metallic impurities such as iron, silicon, and sodium are left behind as solids during the digestion period due to the preferential digestion of aluminum by the hydrochloric acid, thereby allowing the solid metal impurities to be conventionally or magnetically filtered from the sol immediately subsequent to digestion and preferably in an oxygen free atmosphere so as to not oxidize these impurities and thereby make them soluble in the sol.

Once the sol-gel is prepared, it is then seeded with very fine crystals of high purity alpha alumina, a process reported in the literature to lower the phase transformation temperature of alpha alumina. Our invention uses a higher purity alpha alumina seed and a higher purity precursor sol-gel alumina than the prior art, that is, alpha alumina which has a sodium content of about 10 parts per million (ppm), in contradistinction to the use of commercially available alpha alumina having a sodium content of about 80 ppm, and shows a lower minimum temperature necessary for the phase transformation. This seeding unexpectedly produces a calcined product which requires considerably less ball milling than does a non-seeded alpha alumina to reduce the particle size to the requisite range. The effect of the alpha phase transformation at a lower temperature thus provides for less sintering and gives a more friable product as shown in Example II.

When this product is pressed into a disk and fired for two hours at 1600° C., it will be found that the alumina will sinter to over 96% of its theoretical density. Since a large amount of energy and labor is involved in the ball milling step, our invention has unexpectedly afforded a cheaper method of achieving high purity, small size alpha alumina. The old process led to a desired highly porous substrate necessary for catalyst operation whereas our new method leads toward a relatively non-porous alpha alumina approaching theoretical density when sintered. This means that the green body compacts (not yet fired) will not shrink very much when sintered to the desired final shape and that cracking as a result of shrinking or densification will be better controlled.

The process of this invention may be effected in any suitable manner and may comprise either a batch or continuous type of operation. For example, when a batch type operation is employed, the aluminum metal and hydrochloric acid may be placed, along with some water, in an appropriate vessel. Additions of the requisite quantities of additional aluminum and hydrochloric acid are continued, with heating when necessary, until the proper solids content, based on aluminum, is reached, at which time a rapid filtration will take place, preferably in the absence of oxygen, to remove the excess aluminum and other solid contaminants (dross). The resulting purified sol is now seeded with high purity alpha alumina and subsequently spray dried to give a solid which is then calcined at the proper temperature to afford the conversion to friable alpha alumina.

It is also contemplated within the scope of this invention that the process may be effected in a continuous manner of operation. When this type of operation is employed, the hydrochloric acid and water are added when necessary to the reaction vessel containing a bed of aluminum over which a digestion stream is continuously recirculated and in which vessel the aluminum can be refurnished without disruption of the circulating digestion sol solution. If so desired, the hydrochloric acid and the water may be added as a mixture, or, if so desired, each may be added as separate streams. After passage through the reactor for a predetermined period of time, a slipstream is withdrawn and subjected to filtration, preferably in the absence of air, with subsequent spray drying of the filtered sol to give a solid product.

The following examples are given for the purpose of illustration. However, it is to be understood that these examples are only illustrative in nature and that this invention is not necessarily limited thereto.

EXAMPLE I

To a large (12L) round bottom flask was added 4,000 grams (g) of water ($H_2O$), 1500 g of aluminum metal pellets (99.97% pure), and 800 milliliters (ml) of concentrated huydrochloric acid. After about 4 cubic feet ($ft^3$) of hydrogen gas was evolved, as measured by a wet test meter, 1250 ml of concentrated hydrochloric acid and 1000 ml of water were added over a span of 25 hours at an interval time of 20 minutes for portions measuring 200 ml hydrochloric acid and 200 ml water. During this interval adding time period, 4500 g of additional aluminum pellets were introduced to the reaction mixture. Digestion at 96°–980° C. was carried out for 17 hours until 60 $ft^3$ of hydrogen gas was evolved, at which time the sol was collected and the undissolved solids were filtered out by passing the sol through a fine linen cloth. This sol was then used in Example II below and produced a solids content ranging from about 0.1 to about 15.5% by weight solids based on aluminum with a preferred solids content of about 14 to about 15.5%

EXAMPLE II

Two samples of alumina were prepared from the same sol which was prepared according to the method set forth in Example I above with the difference that one sample was seeded with alpha alumina prior to spray drying and the other was not seeded at all. Both product aluminas were calcined to produce alpha alumina for two hours in a program controlled tube furnace subsequent to being ball milled for 96 hours and then pressed into one half inch diameter disks without the aid of a binder and at two different pressures: 10,000 pounds per square inch ($lbs/in^2$) and 40,000 $lbs/in^2$. The resultant disks were then sintered for 2 hours at 1600° C. The results are displayed in Table I and show that the seeded alumina achieves 96.2–96.7% of theoretical density while the unseeded range is 89.4–91.7% of theoretical density. For comparison purposes an unseeded, 1000° C. calcined, alpha alumina precursor sample is included in Table 1.

TABLE I

|  | UNSEEDED | UNSEEDED | SEEDED |
| --- | --- | --- | --- |
| Calcination Temp °C./2 hrs. | 1000° C. | 1200° C. | 1000° C. |
| Sintering Temp °C./2 hrs. | 1600° C. | 1600° C. | 1600° C. |

|  | UNSEEDED | | UNSEEDED | | SEEDED | |
| --- | --- | --- | --- | --- | --- | --- |
| $Lbs/in^2$ | Green Density | Fired Density | Green Density | Fired Density | Green Density | Fired Density |
| 10,000 | 1.50 g/cc | 2.10 g/cc | 2.24 g/cc | 3.56 g/cc | 2.18 g/cc | 3.85 g/cc |
| 40,000 | 1.81 g/cc | 3.08 g/cc | 2.32 g/cc | 3.65 g/cc | 2.32 g/cc | 3.83 g/cc |

EXAMPLE III

A study on ball milling times versus particle size was carried out on the seeded and unseeded alumina sol product. The seeded alumina sol product was produced at a calcining temperature of 1050° C. while the unseeded alumina sol product needed 1200° C. to effect phase transformation to the alpha state. Each solid product recovered from the spray drying of the respective sols was calcined to the alpha state and then ball milled for 96 hours with samples withdrawn at 24 hour, 48 hour and 96 hour intervals and the particle size of the samples was determined by a Helium-Neon Laser Light Scattering (Leeds and Lorthrup Microtrac) analysis. In each case the starting sample size began at about an average value of 3 microns whereas a requisite target size is less than 1 micron. The analyses are displayed in Table II wherein the size is an average particle size.

TABLE II

BALL MILLING TIME VERSUS PARTICLE SIZE OF ALPHA ALUMINA

| Time (Hours) | 1050° C. size (seeded) | 1200° C. size (unseeded) |
|---|---|---|
| 24 | 1.1 microns | 2.1 microns |
| 48 | 0.9 microns | 1.6 microns |
| 96 | 0.8 microns | 1.0 microns |

We claim as our invention:

1. A method for the preparation of high purity, fine particulate, friable alpha alumina from an alumina sol comprising the steps of
   (a) digesting aluminum metal containing contaminants in an excess of aluminum metal with hydrochloric acid and water at digestion conditions to produce an alumina sol containing solid contaminants and excess aluminum metal;
   (b) purifying said sol;
   (c) seeding said purified sol with fine particulate alpha alumina;
   (d) drying said seeded sol to produce an alpha alumina precursor;
   (e) calcining said dried precursor at calcination conditions to produce a high purity, friable alpha alumina; and,
   (f) recovering said alpha alumina.

2. The method as set forth in claim 1 further characterized in that said digestion conditions include a temperature in the range of from about 25° C. to about 100° C. and a time in the range of from about 24 hours to about 48 hours.

3. The method as set forth in claim 1 further characterized in that said purification of said sol is effected by filtration.

4. The method as set forth in claim 1 further characterized in that said drying of said sol is effected by spray drying said sol.

5. The method as set forth in claim 1 further characterized in that said drying of said sol is effected by spin drying said sol.

6. The method as set forth in claim 1 further characterized in that said drying of said sol is effected by flash drying said sol.

7. The method as set forth in claim 1 further characterized in that said calcination conditions include a temperature in the range of from about 1000° C. to about 1100° C. and a time in the range of from about 60 minutes to about 120 minutes.

8. The method as set forth in claim 1 further characterized in that said hydrochloric acid is present in a molarity in the range of from about 3M to about 12M.

9. The method as set forth in claim 1 further characterized in that said purification is effected in the absence of oxygen.

10. The method as set forth in claim 1 further characterized in that said purification is effected in the presence of oxygen.

* * * * *